US010572561B1

(12) United States Patent
Anderson et al.

(10) Patent No.: US 10,572,561 B1
(45) Date of Patent: *Feb. 25, 2020

(54) PERFORMING MULTIPLE RELATED SEARCHES (71) Applicant: Google LLC, Mountain View, CA (US)

(72) Inventors: Corin Anderson, Mountain View, CA (US); Benedict A. Gomes, Palo Alto, CA (US)

(73) Assignee: Google LLC, Mountain View, CA (US)

(*) Notice: Subject to any disclaimer, the term of this patent is extended or adjusted under 35 U.S.C. 154(b) by 229 days.

This patent is subject to a terminal disclaimer.

(21) Appl. No.: 15/656,761

(22) Filed: Jul. 21, 2017

Related U.S. Application Data

(63) Continuation of application No. 13/180,169, filed on Jul. 11, 2011, now abandoned, which is a continuation of application No. 12/116,698, filed on May 7, 2008, now Pat. No. 7,991,780.

(51) Int. Cl.
G06F 16/00 (2019.01)
G06F 16/9535 (2019.01)
G06F 16/9038 (2019.01)

(52) U.S. Cl.
CPC ...... G06F 16/9535 (2019.01); G06F 16/9038 (2019.01)

(58) Field of Classification Search
CPC .... G06F 16/951; G06F 16/00; G06F 16/3329; G06F 16/3338; G06F 16/90324; G06F 16/9535; G06F 16/955; G06F 16/9038; H04L 29/12066
See application file for complete search history.

(56) References Cited

U.S. PATENT DOCUMENTS

| | | | |
|---|---|---|---|
| 6,772,150 B1 | 8/2004 | Whitman et al. | |
| 6,876,997 B1 | 4/2005 | Rorex et al. | |
| 7,152,057 B2 | 12/2006 | Brill et al. | |
| 7,167,901 B1* | 1/2007 | Beadle | G06F 16/9535 |
| | | | 709/207 |
| 7,212,996 B1 | 5/2007 | Carnahan et al. | |
| 7,430,563 B2 | 9/2008 | Mather | |
| 7,523,103 B2 | 4/2009 | Goel et al. | |
| 7,672,932 B2 | 3/2010 | Hood et al. | |
| 7,707,220 B2 | 4/2010 | Bonabeau et al. | |
| 7,747,638 B1 | 6/2010 | Loo et al. | |
| 7,840,589 B1 | 11/2010 | Holt et al. | |

(Continued)

*Primary Examiner* — Merilyn P Nguyen
(74) *Attorney, Agent, or Firm* — Fish & Richardson P.C.

(57) ABSTRACT

A first search is performed in response to a received search query. The first search is based at least in part on a first portion of the search query. In the first search, a first set of content items are searched over to identify a first set of search results. Each result in the first set of search results identifies at least one content item of the first set of content items. A second set of content items for performing a second search is determined based at least in part on one or more of the results in the first set of search results. The second set of content items includes content items not included in the first set of search results. A second search is performed, searching over the second set of content items to identify a second set of search results. The second search is based at least in part on a second portion of the search query. Each result in the second set of search results identifies at least one content item of the second set of content items.

11 Claims, 4 Drawing Sheets

(56) References Cited

U.S. PATENT DOCUMENTS

| | | | |
|---|---|---|---|
| 7,972,205 B2* | 7/2011 | Krishna | A63F 13/12 |
| | | | 463/9 |
| 8,862,572 B2* | 10/2014 | Lucovsky | G06Q 30/02 |
| | | | 707/722 |
| 2004/0138988 A1 | 7/2004 | Munro et al. | |
| 2004/0162849 A1* | 8/2004 | Kumpitsch | G06F 16/958 |
| 2005/0240557 A1 | 10/2005 | Rorex et al. | |
| 2006/0010117 A1 | 1/2006 | Bonabeau et al. | |
| 2006/0059126 A1* | 3/2006 | Naick | G06F 16/951 |
| 2006/0106793 A1* | 5/2006 | Liang | G06F 16/3338 |
| 2006/0161520 A1* | 7/2006 | Brewer | G06F 16/951 |
| 2006/0167842 A1 | 7/2006 | Watson | |
| 2006/0218146 A1 | 9/2006 | Bitan et al. | |
| 2006/0265417 A1 | 11/2006 | Amato et al. | |
| 2006/0028416 A1 | 12/2006 | Gross et al. | |
| 2006/0282416 A1 | 12/2006 | Gross et al. | |
| 2006/0287985 A1 | 12/2006 | Castro et al. | |
| 2007/0112759 A1 | 5/2007 | Kulakow et al. | |
| 2007/0266022 A1 | 11/2007 | Frumkin et al. | |
| 2008/0010248 A1 | 1/2008 | Vautier | |
| 2008/0160490 A1 | 7/2008 | Gomes et al. | |
| 2008/0222140 A1* | 9/2008 | Lagad | G06F 16/951 |
| 2008/0243787 A1 | 10/2008 | Stading | |
| 2008/0244429 A1 | 10/2008 | Stading | |
| 2009/0006351 A1* | 1/2009 | Stephenson | G06F 16/958 |
| 2009/0077037 A1 | 3/2009 | Wu et al. | |
| 2009/0150343 A1 | 6/2009 | English et al. | |
| 2009/0171907 A1 | 7/2009 | Radovanovic | |
| 2009/0265331 A1* | 10/2009 | Chandrasekar | G06F 16/9535 |

* cited by examiner

FIG. 1

Web Images Video News Maps Gmail more ▼ — 202

Google™ [vintage clothes] [Search] Advanced Search Preferences
                         204

Web                                    1 - 10 of about 5,390,000 for vintage clothes. (0.07 seconds)

Vintage clothes                                        Sponsored Links
www.vintagetrends.com   Vintage clothing from all eras, shirts, pants, t-shirts and more.
                                                           Vintage Dress
Tip: Save time by hitting the return key instead of clicking on "search" — 208    Designer Gowns & Dresses on Sale
                                                           TheFind: Shopping Search Reinvented
Search within top 10 results for vintage clothes: [jeans] — 210               www.TheFind.com/Dresses RustyZipper.Com Vintage Clothing on the Web - Over 12000 items! — 206a        40s - 70s Vintage Clothes
www.rustyzipper.com/ - 23k - Cached - Similar pages                                Women's & Men's Vintage 40's-70's
  212a— Womens Vintage Jeans Pants, vintage denim at RustyZipper.Com Vintage Clothing.   Hippy, Rockabilly, Mod, Disco
  212b— Mens Vintage Jeans Pants, vintage denim at RustyZipper.Com Vintage ... - shop.cfm/r   www.rustyzipper.com
         Mens Pants - Jeans at RustyZipper.Com Vintage Clothing.
  212c— Vintage Jeans Pants, vintage denim at RustyZipper.Com Vintage Clothing - shop.cfm?T   Vintage Clothes For Less
         Pants - Jeans at RustyZipper.Com Vintage Clothing.                    Looking for Vintage Clothes?
                                                                                   Find exactly what you want today.
Ballyhoo Vintage Clothing. Stunning vintage clothing from the last ... — 206b   www.eBay.com
www.ballyhoovintage.com/ - 31k - Cached - Similar pages
  212d— Ballyhoo Vintage Clothing Seventies Jeans - 22/22541. html            Vintage Clothes
         1970s Flared Bootcut Jeans by Maverick. This was Maverick's take on d...    Save 10% - 60% Online
  212e— Ballyhoo Vintage Clothing, 1940s Vintage Jeans - 53/53112.html           Year End Clearance at Target.com
         Early 1940s Plaid Ranch Jeans (also known as Lunch Pants) with pocket riv...   www.Target.com
  212f— Ballyhoo Vintage Clothing 170s Maverick Jeans - 72/72255.html
         Vintage Clothing 1970s Maverick Jeans. ... 70s Maverick Jeans...      Firefly Vintage Clothing
                                                                                   A unique collection of rare
You've arrived. Welcome to vintage clothing heaven! vintagevixen ... — 206c    and collectible vintage clothing
www.vintagevixen.com/ - 22k - Cached - Similar pages                               www.fireflyvintage.com
  212g— Men's Wear @ vintagevixen.com - forMen.asp?typeitem=58&start=20
         Men's Wear @ vintagevixen.com. - 31 items available pants, jeans &...  Get some Vintage-a-Peel
  212h— Vintage Clothing-Related Links @ vintagevixen.com - vintageClothingResources.asp   ...From Ms. Peelpants. Including
         Designer Jeans - Madison in Los Angeles offers Designer Clothing including...   Ossie Clark, Biba and many more!
         Quantity Available for Item 71637129 @ vintagevixen.com - quantityDisplay.asp?itemI   www.vintage-a-peel.co.uk All Vintage Clothing

PERFORMING MULTIPLE RELATED SEARCHES

CROSS-REFERENCE TO RELATED APPLICATIONS

This application is a continuation application of and claims priority to U.S. application Ser. No. 13/180,169, filed on Jul. 11, 2011, which is a continuation of and claims priority to U.S. application Ser. No. 12/116,698, filed on May 7, 2008, and the entire contents of each are hereby incorporated by reference.

BACKGROUND

This document relates to performing multiple searches.

The rise of the Internet has enabled access to a wide variety of content items, e.g., video and/or audio files, web pages for particular subjects, news articles, etc. Content items of particular interest to a user can be identified by a search engine in response to a query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

SUMMARY

In one general aspect, a first search is performed in response to a received search query. The first search is based at least in part on a first portion of the search query. In the first search, a first set of content items are searched over to identify a first set of search results. Each result in the first set of search results identifies at least one content item of the first set of content items. A second set of content items, for performing a second search, is determined based at least in part on one or more of the results in the first set of search results. The second set of content items may include content items not included in the first set of search results. A second search is performed, searching over the second set of content items to identify a second set of search results. The second search is based at least in part on a second portion of the search query. Each result in the second set of search results identifies at least one content item of the second set of content items.

Implementations can include one or more of the following features. The second set of content items can be a subset of the first set of content items. The second set of content items can be determined based in part on the second portion of the search query. The first set of content items can be a first set of web pages. Each result in the first set of search results can identify one of the web pages by a web address of the web page.

The second set of content items can be a second set of web pages. The second set of web pages can be determined based on a first result in the first set of results, where the first result identifies a first web page. A web address of the first web page can include a domain name, and a web address of each of the second set of web pages can also include the domain name. The first web page can include a link to each of the second set of web pages. Each of the second set of web pages can include a link to the first web page. The second set of content items can be assets of a content item. The first web page can have a number of assets, and each of the second set of content items can be one of the assets of the first web page.

The first and second portions of the search query can be received together or separately. A graphical user interface can allow entry of the search query on a user machine. The graphical user interface can have a plurality of text boxes, including a first text box and a second text box. The first text box can allow entry of the first portion of the search query, and the second text box can allow entry of the second portion of the search query. The graphical user interface can include a text box for entering a single text string, and receiving a search query can include receiving the text string entered in the text box. The first portion of the search query can be identified based on the received text string. The second portion of the search query can also be identified based on the received text string.

A first graphical user interface can be presented, allowing entry of the first portion of the search query on the user machine, and an identification of the first set of results can be displayed on the user machine. After displaying the identification of the first set of results, a second graphical user interface, allowing entry of the second portion of the search query, can be presented on the user machine. The first set of results and the second set of results can be sent to the user machine.

The details of one or more implementations are set forth in the accompanying drawings and the description below. Other features will be apparent from the description and drawings, and from the claims.

DESCRIPTION OF DRAWINGS

FIG. 2 is an example screen shot of a graphical user interface for performing multiple related searches.

Like reference symbols in the various drawings indicate like elements.

DETAILED DESCRIPTION

Multiple related searches may be used to identify one or more content items of interest to a user more efficiently and/or accurately. Multiple related searches can be performed in sequence, and after the first search, each search in the sequence can be based on the results of one or more earlier searches in the sequence. In some implementations, a second (or subsequent) search identifies content items that were not identified in the first (or a different earlier) search. Each of the multiple related searches can be based on different portions of a search query. A first search may identify a particular web page based on a first portion of a search query (e.g., "Las Vegas hotels"). A second search may be based on a second portion of the search query (e.g., "buffets") and a particular web page identified by the first search. For example, the second search can, in some cases, search over all web pages that provide a link to (and/or all web pages that are linked to by) the particular web page identified by the first search. As another example, if the particular web page identified by the first search is a home page or another particular page within a website, the second search can search all of the web pages in the website or domain. The user can identify the second portion (and/or subsequent portions) of the search query after reviewing results from a previous search, or a user can identify the second portion (and optionally subsequent portions) of the search query concurrently with the first portion of the search query. The first and second portions of the search query can be entered by the user, for example, in separate text boxes, or the first and second portions of the search query can be identified automatically based on a search query entered by the user, for example, in a single text box.

Figure 1:
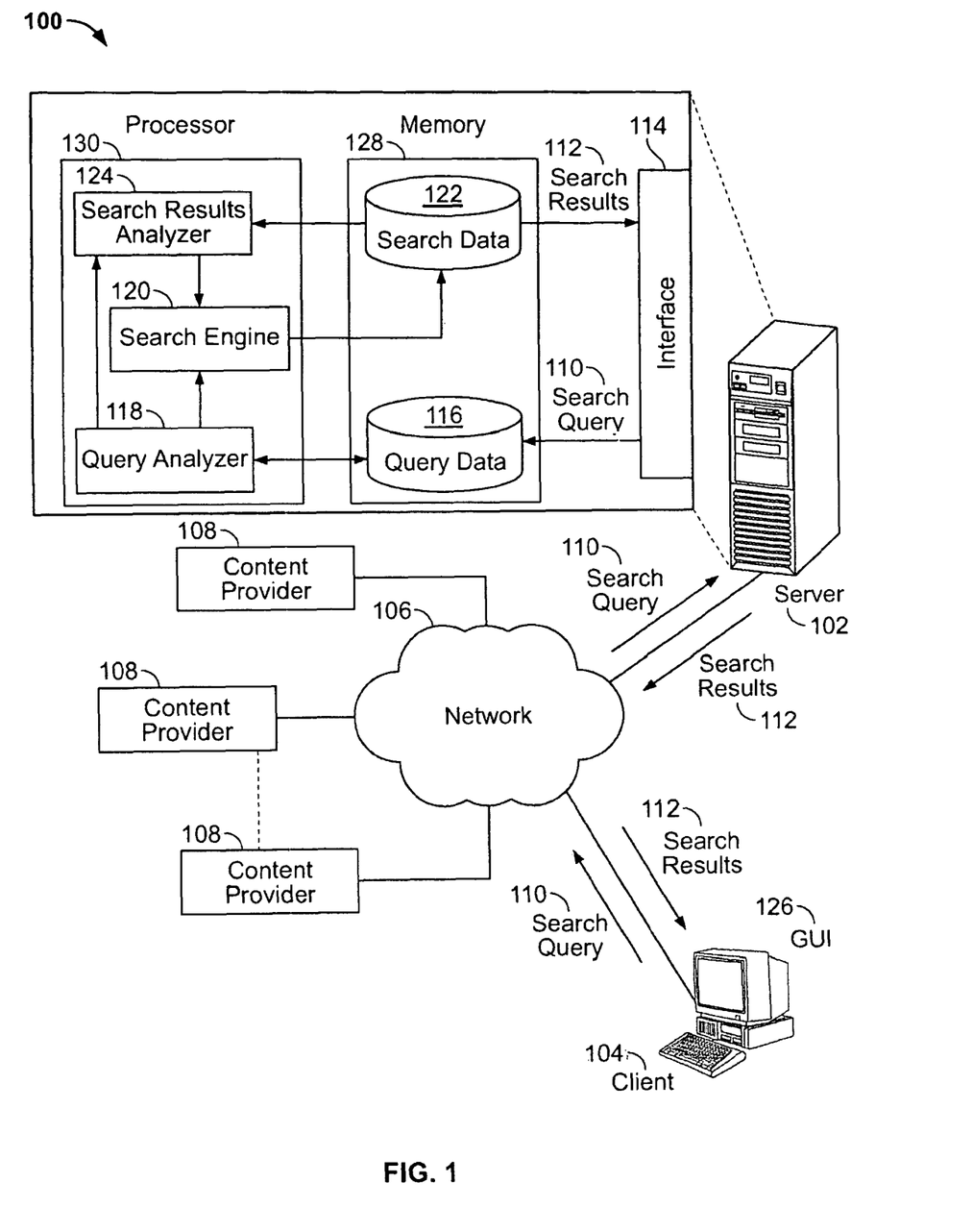
FIG. 1 is a block diagram illustrating an example system for performing multiple related searches.

FIG. 1 is a block diagram illustrating an example system 100 for performing multiple searches. The system 100 includes a server 102 and a client machine 104 in communication over a network 106. The server 102 and the client 104 can also communicate with multiple content providers 108 over the network 106. According to the illustration, the client 104 sends a search query 110 to the server 102, and the server 102 performs multiple related searches based on the query 110. The server 102 can receive the search query 110 as a single transmission, or the server 102 can receive different portions of the search query 110 at different times. For example, the server 102 can perform a first search based on a first part of the search query 110, send search results 112 to the client 104, then receive a second part of the search query, and then perform a second search based on the second part of the search query 110. Each of the multiple searches can identify content items (e.g., web pages, videos, documents) provided by content providers 108. The server 102 may identify, and possibly rank, one or more content items that are related to the search query 110. The server sends search results 112 to the client 104 over the network 106. Based on the search results 112, the client 104 can access one or more of the content items identified by the server 102 during the search. For example, the search results 112 can include links to web pages provided by a content provider 108.

The server 102 can receive, transmit, process and store data related to multiple related searches. In particular, the server 102 can receive a search query 110, perform multiple related searches based on the query 110, and transmit search results 112. The server 102 can be implemented using computers other than servers, as well as a server pool. Server 102 can be any computer, electronic or processing device such as a blade server, a general-purpose personal computer (PC), a Macintosh, a workstation, or a Unix-based computer. The system 100 can include computers other than general purpose computers as well as computers without conventional operating systems. The server 102 can be adapted to execute operating systems including Linux, UNIX, Windows Server, or others. In certain implementations, the server 102 includes or is coupled with a web server and/or a mail server. The various elements of the server 102 can be implemented as a single machine or as multiple machines connected over a network, such as an intranet, the network 106, and/or the Internet.

Server 102 includes a memory 128, a processor 130, and an interface 114. The memory 128 includes machine-readable media for storing information related to multiple searches, including query data 116 and search data 122. The memory 128 can be volatile or non-volatile memory including magnetic media, optical media, random access memory (RAM), read-only memory (ROM), removable media, and/or others. In addition to query data 116 and search data 122, the memory 128 can store other data such as applications or services, firewall policies, a security or access log, HTML files or templates, data classes or object interfaces, child software applications or sub-systems, and others. The memory 128 can additionally store information related to content items, for example, the content items provided by content providers 108.

The query data 116 includes information related to search queries 110 received by the server 102. The query data 116 can include information related to many search queries received from multiple different clients. The query data 116 can include an identification of multiple different parts of the search query 110 for performing multiple searches. For example, the query data 116 can include an identification of a first portion of a search query 110 for performing a first search and an identification of a second (and/or a subsequent) portion of the search query 110 for performing a second (and/or a subsequent) search. The query data 116 can include information related to modifications to the search query 110, such as automatic spelling corrections. The query data 116 can additionally include information about tokens (described below) used in the search query 110. The query data 116 can include information about which client transmitted the query 110 and information about previous queries received from the same client.

The search data 122 includes information provided by the search engine 120, such as information related to search results 112. The search data 122 can include information related to one or more different search queries 110. The search data 122 can include information related to each of multiple related searches that are collectively based on a single search query 110. For example, the search data 122 can include a first set of search results from a search based on a first portion of a search query and a second (and/or a subsequent) set of search results from a search based on a second (and/or a subsequent) portion of the search query. In addition to an identification of the content items identified during a search, the search data 122 can include other information about each content item identified during the search, for example, a web address, a summary of each content item, an identification of pages similar to each content item, a "snippet" (e.g., a short text excerpt) from each content item, a date and/or time when each content item was last updated, a size (e.g., 52 kilobytes) of each content item, a popularity or user rating of each content item, a search score associated with each content item, a listing of links (e.g., hyperlinks) included in each content item, and/or a listing of other content items that link to each of the content items identified during the search.

The processor 130 executes instructions and manipulates data to perform operations of the server 102. Although FIG. 1 illustrates a single processor 130 in the server 102, multiple processors 130 may be used, and reference to processor 130 is meant to include multiple processors 130 where applicable. In the illustrated implementation, processor 130 executes a query analyzer 118, a search engine 120, and a search results analyzer 124, for example, in response to a request or input from a user of server 102 or any appropriate computer system coupled with network 106.

The query analyzer 118 can include any software, hardware, and/or firmware, or combination thereof, operable to process a search query 110. The query analyzer 118 can take as an input the search query 110 and identify multiple portions of the search query 110 for performing multiple related searches. The query analyzer 118 can take as an input a single portion of the search query 110 or an aggregate of all portions of the search query 110. The query analyzer 118 can identify search tokens in the search query 110 (or a portion of the search query 110) and use the search tokens to identify a type of search to be performed. A search token may, for example, indicate an essential term in the search query, a term to exclude from the search, or a type of content item to search for during the search. A search token may, for example, identify the first, second, and/or other portions of the search query 110. The query analyzer 118 can identify misspelled words and/or a probability that a word is misspelled and take appropriate action, such as correcting the misspelled word. The query analyzer 118 can receive information from and send information to the memory 128. For example, the query analyzer 118 can receive a search query 110 from the query data 116, identify a first portion and a second portion of the query 110, and store the output in the query data 116. The query analyzer 118 can send information, such as a search query 110 or a portion of a search query 110, to the search engine 120 and/or to the search results analyzer 124.

The search engine 120 can perform one or more searches for content items based on the search query 110 and/or a portion of the search query 110. In some implementations, the search engine searches the Internet for web pages that most accurately define the term or terms included in a portion of the search query 110. For example, if a first portion of a search query is "Las Vegas hotels," the search engine 120 can search for web pages that are related to "Las Vegas hotels." In some implementations, the search engine performs one or more subsequent searches after the first search, and the one or more subsequent searches are based on the results of the first (or another previous) search and/or a second (or subsequent) portion of the search query. For example, if a second portion of the search query is "buffet," the search engine 120 can search for the term "buffet" in the web sites related to one or more of the first search results. The search engine 120 can search over local data stored in the memory 128 and/or remote data stored by a content provider 108. The search engine 120 can search over information available over any network or other connection available to the server 102. The search engine 120 can receive information from the query analyzer 118 and send information to the memory 128. For example, the search engine 120 can store in the search data 122 information related to web pages identified during a search.

The search results analyzer 124 can process search data 122 and/or query data 116. The search results analyzer 124 can determine a set of content items, or properties of content items, over which to search during a second (or subsequent) search. In some implementations, the search results analyzer 124 takes as an input a first set of search results identified during a first search, and the search results analyzer 124 determines, based at least in part on one or more of the results in the first set of search results, a second set of content items to be searched over in a second search. The search results analyzer 124 may determine the second set of content items by identifying the actual content items (e.g., by a web address) or by identifying a property of the content items. Each content item in the second set of content items can be identified based on its relationship to one or more of the results of the first search. For example, each of the second set of content items can be web pages included in the same website as one of the results from the first search. As another example, each of the second set of content items can be a web page that is linked to by one or more websites identified during the first search. As another example, each of the second set of content items can be a web page that provides a link to one or more websites identified during the first search. As another example, each of the second set of content items can be an asset of a content item identified during the first search. Assets of a content item can include text, images, links, metadata, and other information included in or referenced by the content item.

In some implementations, firmware and/or wired or programmed hardware, alone or in combination with software, may be used in lieu of software. The query analyzer 118, the search engine 120, and the search results analyzer 124, may be written or described in any appropriate computer language including C, C++, Java, J #, Visual Basic, assembler, Perl, any suitable version of 4GL, as well as others. While the query analyzer 118, the search engine 120, and the search results analyzer 124 are illustrated as including individual modules, each may include numerous other sub-modules or may instead be a single multi-tasked module that implements the various features and functionality through various objects, methods, or other processes. Further, while illustrated as internal to server 102, one or more processes associated with the query analyzer 118, the search engine 120, and the search results analyzer 124 may be stored, referenced, or executed remotely. Moreover, the query analyzer 118, the search engine 120, and the search results analyzer 124 may be a child or sub-module of another software module.

The server 102 may also include an interface 114 for communicating with other computer systems, such as the client 104 and the content providers 108, over the network 106 in a client-server or other distributed environment. In certain implementations, the server 102 receives data from internal or external senders through interface 114 for storage in the memory 128 and/or processing by the processor 130. The interface 114 can be implemented as logic encoded in software and/or hardware and operable to communicate with network 106. The interface 114 can include software supporting one or more communications protocols associated with the network 106 or hardware operable to communicate signals.

The client 104 is any device (e.g., computing device) operable to connect or communicate with the server 102 or the network 106. The client 104 can receive, transmit, process, and store data associated with multiple related searches. While the illustrated implementation includes a single client 104, the system 100 may include any number of clients 104 communicably coupled to the network 106. The client 104 may be operated by a single user, by multiple users, or automatically (e.g., executing programmed instructions with little or no human interface). Furthermore, "client", "user", and "user machine" may be used interchangeably, as appropriate, to refer to the client machine 104 and/or a user of the client machine 104.

Client 104 can be a personal computer, touch screen terminal, workstation, network computer, kiosk, wireless data port, smart phone, personal data assistant (PDA), one or more processors within these or other devices, or any other suitable processing or electronic device used by an advertiser to access the network 106. For example, client 104 can be a PDA wirelessly connected with an external or unsecured network. In another example, client 104 can be a laptop that includes an input device, such as a keypad, touch screen, mouse, or other device that can accept information, and an output device that conveys search results 112, including digital data, visual information, or GUI 126. Both the input device and output device may include fixed or removable storage media such as a magnetic computer disk, optical storage, flash memory, or other suitable media to both receive input from and provide output to users of clients 104 through the display, namely the client portion of GUI 126.

GUI 126 comprises a graphical user interface operable to allow the user of client 104 to interface with at least a portion of system 100, for example, to enter a search query. A screenshot of an example GUI 126 is provided in FIG. 2. GUI 126 can be an efficient and/or user-friendly presentation of data provided by or communicated within system 100. GUI 126 can include customizable frames or views having interactive fields, text boxes, pull-down lists, and/or buttons operated by the user. GUI 126 can display one or more text boxes for entering a search query and/or search results from a search related to a previously entered search query. For example, the GUI 126 can present two, three, or more text boxes for entering each portion of a multiple-search query. Alternatively, the GUI 126 can present a single text box for entering a first portion of a search query. Then, when search results from the first search query are presented to the user, the GUI 126 can provide a second text box for entering a second portion of the search query. The GUI 126 can be configurable, supporting a combination of tables, graphs, text, and images. The term graphical user interface may be used in the singular or in the plural to describe one or more graphical user interfaces and each of the displays of a particular graphical user interface. For example, the GUI 126 can be implemented using a generic web browser or touch screen that processes information in system 100 and efficiently presents the results to the user. The client 104 can transmit data (e.g., the search query 110) to the server 102 using the web browser (e.g., Microsoft Internet Explorer, Mozilla Firefox, Netscape Navigator), and the client 104 can display data (e.g., search results 112, HTML or XML documents) received from the server over the network 106.

The network 106 facilitates wireless and/or wireline communication between the server 102 and other local or remote entities including the client 104 and the content providers 108. The network 106 can include all or a portion of a secured network. While illustrated as a single network, network 106 may be a continuous network logically divided into various sub-nets or virtual networks. In some implementations, network 106 encompasses any internal or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global network known as the Internet, and/or any other communication system or systems at one or more locations.

The content providers 108 are systems or system components providing network access to content items. The content providers 108 can be servers hosting websites, web pages, or other types of information. For example, a search result 112 returned by the server 102 to the client 104 can be a link to a particular web page stored locally by one of the content providers 108. The client 104 can then use the link to access the particular web page.

The search query 110 can be a text string including one or more search terms. A search query 110 can include Boolean operators, search tokens, and/or other types of search-related information. A search query 110 can include multiple portions of the search query 110 for performing multiple related searches. The multiple portions can be transmitted concurrently and include an identification of each of the multiple portions of the query. For example, the search query 110 may include special tokens identifying the first portion and the second portion of the query. In other implementations, the multiple portions are transmitted concurrently with no identification of the first or second portion, and the query analyzer 118 divides the query into multiple portions. Alternatively, the multiple portions can be transmitted separately (e.g., at different times). For example, in some implementations, only the first portion of the search query is initially transmitted, and a second (or subsequent) portion of the query is transmitted later, for example, after presenting results from a search based on the first portion of the search query.

The search results 112 can be an identification of content items found by the search engine 120 during a first, second, or subsequent search. For example, a search result can be a link to (or some other identification of a web address of) a web page, a document, or any other electronic file found during a search. The search results 112 can include any information included in search data 122. For example, the search results 112 can include web addresses, content item summaries, links to other content items that are similar to content items found during the search, content item "snippets", content item update information, content item size (e.g., 52 kilobytes, 3.4 megabytes) information, search rankings, search scores, particular assets of content items, and/or others. The search results 112 can be an HTML or XML document that includes search result data or a reference or a link to search result data.

In one aspect of operation, the client 104 transmits, over the network 106, the search query 110 to the server 102. The server 102 stores the search query 110 with query data 116. The query analyzer 118 processes the search query 110, identifying a first portion of the query and a second portion of the query. The query analyzer sends the first portion of the query to the search engine 120, and the search engine performs a first search based on the first portion of the query. The search engine 120 stores the results of the first search with the search data 122. The search results analyzer 124 receives the results of the first search and information about a second portion of the search query 110. In some implementations, the information about the second portion of the search query 110 identifies a type of second search to perform. For example, the information about the second portion of the search query 110 can indicate that a second search is to search over all content items that are linked to by at least one of the content items identified during the first search. In other implementations, the type of second search may be predetermined (e.g., based on the initial page used to initiate the search query 110). Based on the received information, the search results analyzer 124 identifies a second set of content items to search over during a second search. The search engine receives the second portion of the search query and an identification of the second set of content items to be searched over. The identification of the second set of content items can be, for example, a property of the second set of content items, such as a domain name. The identification of the second set of content items can be a complete listing, such as web addresses or file names, of each of the second set of content items. The search engine 120 performs the second search and stores the results of the second search with the search data 122. The server 102 transmits, over the network 106, the search results 112 to the client 104.

In another aspect of operation, the client 104 transmits, over the network 106, a portion of the search query 110 to the server 102. The server 102 then performs a search and transmits the results of the first search to the client 104. In response, the client 104 transmits a second portion of the search query 110, and the server 102 performs a second search based on the first search results and the second portion of the search query 110. The client-side process of receiving search results and transmitting subsequent portions of a search query can continue, for example, for a third search, a fourth search, a fifth search, and so on.

FIG. 2 is an illustration of an example GUI 126. The example GUI 126 can be displayed on a monitor or display screen of client 104 of FIG. 1. The GUI 126 provides a text box 202 for entering a first portion of a search query. For example, a user could enter text defining search terms for the first portion of the search query. As illustrated, the first portion of the search query is defined by the text 204 "vintage clothes." The GUI 126 includes an identification of three search results 206a, 206b, and 206c from the first search. The search results 206 are links to web pages identified, for example, by a search engine based on the first portion of the search query. The GUI 126 also provides a text box 208 for entering a second portion of a search query. For example, after receiving the search results 206 from the first search, the user could enter text defining search terms for the second portion of the search query. As illustrated, the second portion of the search query is defined by the text 210 "jeans." The GUI 126 includes an identification of search results 212a-212h of the second search. The illustrated search results 212 are links to web pages identified, for example, by a search engine based on the second portion of the search query and the results 206 of the first search. Each of the results 212 from the second search is associated with one of the results 206 from the first search. For example, results 212a, 212b, and 212c are associated with result 206a. The first search identified the result 206a, the web address "www.rustyzipper.com," based on the search terms "vintage clothes." In the second search, all web pages associated with the website "www.rustyzipper.com/" were searched based on the search term "jeans." The second search identified results including the result 212a, the web address "www.rustyzipper.com/shop.cfm/rz/type." In some implementations, a GUI 126 is formatted differently from the example GUI 126 of FIG. 2. For example, a GUI 126 can include multiple text boxes (e.g., two or three text boxes) on the initial search page, where a different portion of the search query is entered into each text box. Alternatively, data entered into a single text box (e.g., on the initial search page) can be analyzed and divided into multiple portions automatically (e.g., by the query analyzer 118).

Figure 3:
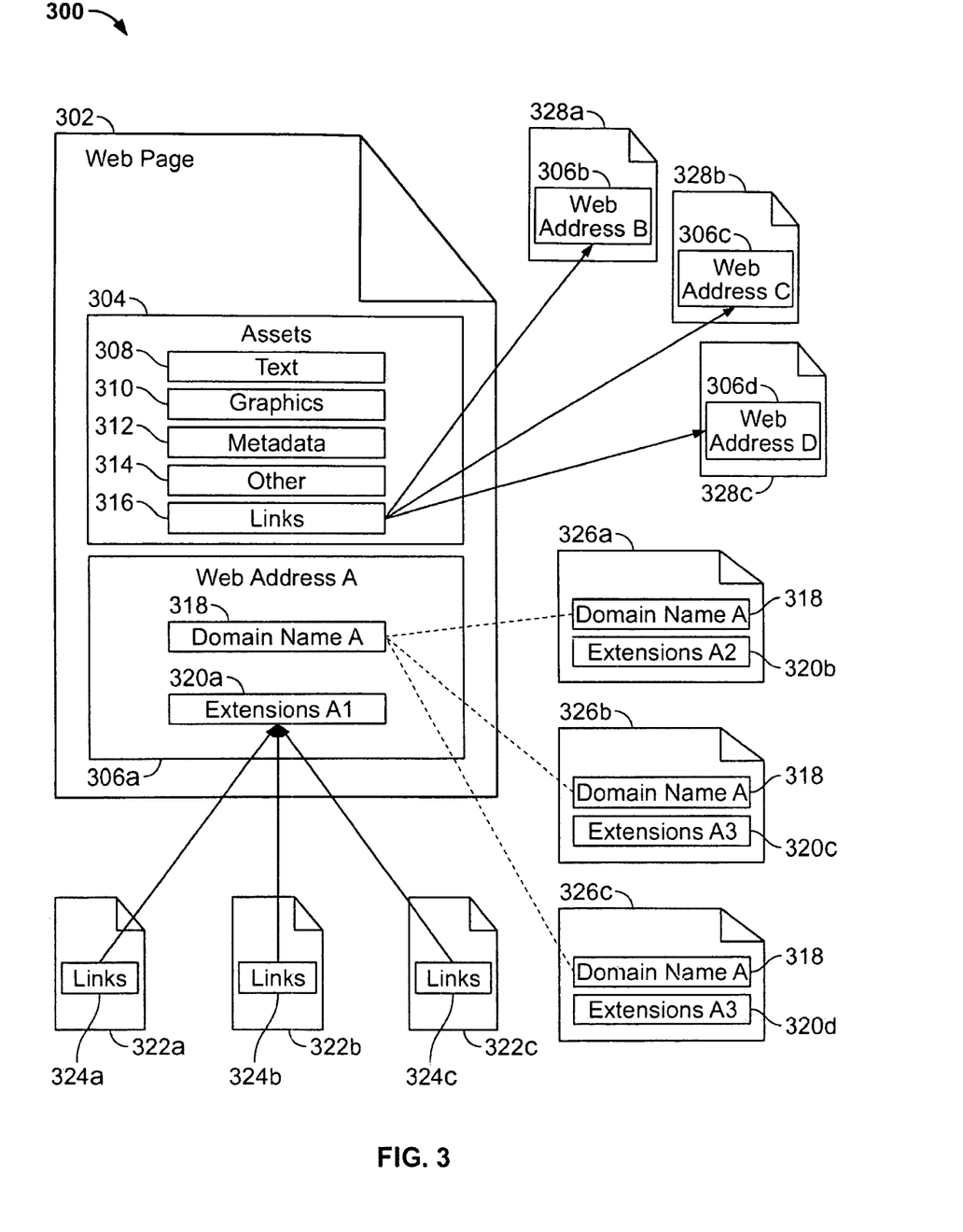
FIG. 3 is a block diagram illustrating example content items.

FIG. 3 is a block diagram 300 illustrating example content items and relationships among the example content items. A first content item is a web page 302 identified by a first search, where the first search is based on a first portion of a search query. A second search can be performed based on a second portion of the search query, and the content items to be searched over during the second search can be determined based on properties of the web page 302. For example, the content items to be searched over during the second search can be web pages 328a, 328b, and 328c, which are linked to by the web page 302. As another example, the content items to be searched over during the second search can be web pages 324a, 324b, and 324c, which provide links to the web page 302. As another example, the content items to be searched over during the second search can be web pages 326a, 326b, and 326c, which have a common domain name as the web page 302. As another example, the content items to be searched over during the second search can be one or more assets 304 of the web page 302.

The web page 302 is an electronic file formatted to be displayed by a web browser or program. The web page 302 has a web address 306a and a number of assets 304. The web address 306a includes two constituent parts: a domain name 318 and extensions 320a. For example, if the web address 306a is "www.ExampleWebAddressA.com/home/index.html," then the domain name 318 is "www.ExampleWebAddressA.com," and the extensions 320a are "/home/index.html." Each of the web pages 326a, 326b, and 326c has the same domain name 318, but different extensions 320b, 320c, or 320d. For example, the web page 326b may have the web address "www.ExampleWebAddressA.com/tools/calendar.html." Each of the web pages 328a, 328b, and 328c has its own web address that is linked to by the web page 302. The web addresses 306b, 306c, and 306d may or may not have any relationship to the web address 306a. For example, the web address 306b could be "web.ExampleWebAddressB.org/index.htm." Each of the web pages 322a, 322b, and 322c includes a link to the web page 302. For example, the web page 322a may include multiple links 324a, and one of the links may identify the web address 306a (e.g., "www.ExampleWebAddressA.com/home/index.html").

The assets of web page 302 include text 308, graphics 310, metadata 312, other data 314, and links 316. The text 308 can include the text displayed when the web page 302 is displayed. The graphics 310 can include the graphics displayed when the web page 302 is displayed. For example, graphics may include one or more of the following formats: bitmap, Joint Photographic Experts Group (JPEG), Tagged Image File Format (TIFF), Portable Network Graphics (PNG), Graphics Interchange Format (GIF), Post Script (PS), Encapsulated Post Script (EPS), Portable Document File (PDF), or others. The metadata 312 can include information that is not displayed by a browser but is used, for example, by a search engine to classify the contents of a web page. The links 316 can include hyperlinks or other entities that identify a web address or filename of a content item. Other data 314 can include any other type of information related to the web page 302 such as multimedia files, scripts, executable codes, and/or data.

Figure 4:
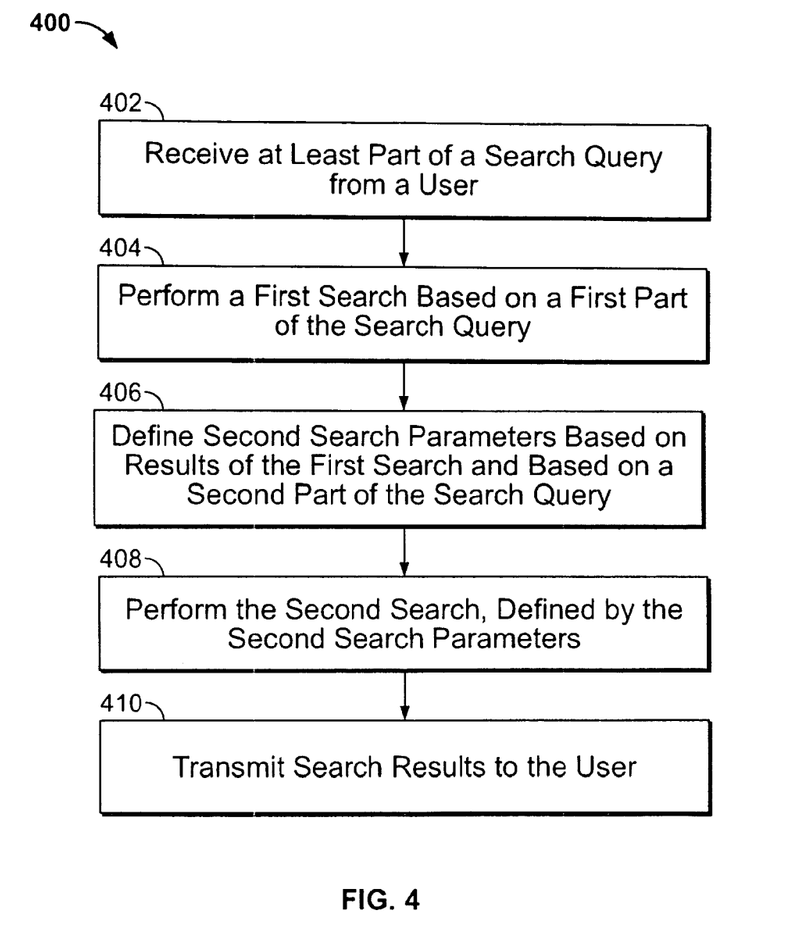
FIG. 4 is a flow chart illustrating an example process for performing multiple related searches.

FIG. 4 is a flow chart illustrating an example process 400 for performing multiple searches in accordance with the present disclosure. The process 400 can be implemented automatically, for example, by a processor executing instructions stored in a machine-readable medium. A user or a server administrator may initiate one or more operations in the process 400, for example by entering a command at a work station.

At 402, at least part of a search query is received. For example, a user of a client machine 104 may enter a search query in a text box provided by a search engine service (e.g., the Google search engine service provided by Google Inc. of Mountain View, Calif., U.S.A.), and the search query can be sent from the client machine and received by a remote server. The text box for entering the search query can be included in a GUI, for example, on a web page provided by the search engine service, and the GUI can be displayed by a browser on the client machine 104. The GUI can include multiple text boxes (e.g., two or three text boxes) for entering multiple parts of the search query at once. Alternatively, the GUI can provide a single text box for entering one or more parts of the search query. In this case, different parts of the search query can be identified either manually by the user (e.g., by tokens in the query or when prompted on a subsequent screen) or automatically by a processor (e.g., based on statistical data).

At 404, a first search is performed based on the first part of the search query. For example, in response to receiving the search query, a server may perform a first search over a first plurality of content items (e.g., web pages) to identify a first set of results for the first search, where each result in the first set of results identifies one of the first plurality of content items. The first plurality of content items can include, for example, all of the content items (e.g., web pages, electronic documents, graphics) provided by one or more content providers over a network (e.g., the Internet). In some implementations, the results of the first search are transmitted to the user after the first search is performed. In other implementations, the results of the first search are not transmitted until after a second or a subsequent search. In other implementations, the results of the first search are not transmitted to the user at all. In some implementations, for example, in the case that only the first part of the search query is received at 402, a second part of the search query is received from the user after the first search is performed. The second part of the search query may be entered by a user, for example, after the user has been shown the results of the first search.

At 406, parameters for a second search are defined based on results of the first search. The parameters for the second search can also be based on a second part of the search query. For example, a server may determine a second plurality of content items for performing the second search, wherein the second plurality of content items includes content items not included in the first set of results. The second plurality of content items can be a subset of the first plurality of content items searched over during the first search, or the second plurality of content items can include content items that were not searched over during the first search. The second plurality of content items may or may not be determined based on the second part of the search query.

For example, the first search (at 404) can be performed, searching over a first set of web pages, and each result from the first search can identify one of the web pages in the first set of web pages. A result can be a web address (or a link including the web address) of one of the web pages in the first set of web pages. The second search can then be performed, searching over a second set of content items. The second set of content items may or may not be web pages. The second set of content items can be determined based on a particular web page (or a particular set of web pages) included in the results of the first search. In some implementations, the particular web page has a web address that includes a domain name, and each of the second set of content items is a web page having a web address that includes the domain name. In some implementations, each of the second plurality of content items is a web page that includes a link to one or more of the web pages included in the results of the first search. In some implementations, each of the second plurality of content items is a web page that is linked to by one or more of the web pages included in the results of the first search. In some implementations, each of the second plurality of content items is an asset (e.g., text, graphics) of one or more of the web pages included in the results of the first search.

At 408, the second search is performed over the second plurality of content items. In some implementations, the second search searches for web pages related to one or more of the results of the first search based on a second portion of the search query. In such an implementation, the second search can add additional results to the results provided by the first search. The second search can be used to locate (and optionally display to the user) links, graphics, and/or specific words or phrases in a web page or a document identified by one of the first search results. The second search can also be used to categorize results of the first search.

In a specific example, a first search returns a number of links to web pages related to "banana nut bread," and a second search looks for the word "salt" in each of the first search result web pages. After the search results are sent to the client machine, the client machine displays a link to each web page identified by the first search, and near (e.g., below) each link to a web page, each occurrence of the word "salt," along with the surrounding text, in the web page is displayed.

At 410, the search results are transmitted to the user. The results can include results from the first search and/or the second search. The results can then be displayed to the user, for example, in a GUI.

While the process 400 is discussed with respect to a first search based on a first part of a search query and a second search based on a second part of the search query, any number of related searches can be performed subsequent to the second search, in a manner similar to the second search. For example, a third search could be performed based on a third part of the search query. The third search could additionally be based on the results of the first search and/or the results of the second search.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Various modifications may be made without departing from the scope of this specification. For example, many different types of second searches, which have not been specifically described herein, may be implemented in the various embodiments of the present disclosure. Accordingly, other embodiments are within the scope of the following claims.

What is claimed is:

1. A computer-implemented method comprising:
   receiving a first search query, the first search query having been entered through a first input box of a search interface;
   in response to receiving the first search query, performing a first search to generate a first set of search results, the first search based at least in part on the first search query, wherein each search result in the first set of search results includes a link to a respective one of a first plurality of web pages, the first plurality of web pages being the respective web pages linked to by the search results in the first set of search results;
   providing the first set of search results for presentation by the search interface along with a second input box that is separate from the first input box and displayed with the first input box;
   for at least two web pages of the first plurality of web pages linked to by a search result in the first set of search results, determining a second plurality of web pages over which to perform a second search, wherein determining the second plurality of web pages includes, for each web page of the at least two web pages, (i) identifying a domain name of the web page, and (ii) identifying all other web pages that have a web address that includes the domain name of the web page, wherein the second plurality of web pages includes only the identified other web pages, and wherein the at least two web pages have different domain names;
   receiving a second search query, the second search query having been entered through the second input box of the search interface while the first set of search results are displayed;
   in response to receiving the second search query, performing the second search over the second plurality of web pages to generate a second set of search results for the second search, the second search based at least in part on the second search query, wherein each search result in the second set of search results includes a link to a respective one of the second plurality of web pages, and wherein at least one search result in the second set of search results includes a link to at least one web page of the second plurality of web pages that is not included in the first plurality of web pages; and
   providing, for presentation by the search interface along with the first set of search results, at least two subsets of search results in the second set of search results, wherein search results are presented such that (i) each subset of search results in the second set of search results is presented subordinate to a corresponding search result in the first set of search results, with the corresponding search result in the first set of search results and the search results in the subset of search results each including a respective link to a respective web page having a same domain name, and (ii) the first search query is shown in the first input box of the search interface, and the second search query is shown separately from the first search query in the second input box of the search interface when search results are presented.

2. The computer-implemented method of claim 1, wherein at least one search result in the first set of search results is provided for presentation before performing the second search over the second plurality of web pages.

3. The computer-implemented method of claim 1, wherein at least one search result in the first set of search results is provided for presentation after performing the second search over the second plurality of web pages, along with at least one search result in the second set of search results.

4. The computer-implemented method of claim 1, wherein determining the second plurality of web pages includes, for each web page of the at least two web pages, identifying web pages that provide a link to the web page, wherein the second plurality of web pages includes the identified web pages that provide the link to the web page.

5. The computer-implemented method of claim 1, wherein determining the second plurality of web pages includes, for each web page of the at least two web pages, identifying web pages that are linked to by the web page, wherein the second plurality of web pages includes the identified web pages that are linked to by the web page.

6. A computing system comprising:
one or more processors; and
one or more computer-readable devices including instructions that, when executed by the one or more processors, cause performance of operations comprising:
receiving a first search query, the first search query having been entered through a first input box of a search interface;
in response to receiving the first search query, performing a first search to generate a first set of search results, the first search based at least in part on the first search query, wherein each search result in the first set of search results includes a link to a respective one of a first plurality of web pages, the first plurality of web pages being the respective web pages linked to by the search results in the first set of search results;
providing the first set of search results for presentation by the search interface along with a second input box that is separate from the first input box and displayed with the first input box;
for at least two web pages of the first plurality of web pages linked to by a search result in the first set of search results, determining a second plurality of web pages over which to perform a second search, wherein determining the second plurality of web pages includes, for each web page of the at least two web pages, (i) identifying a domain name of the web page, and (ii) identifying all other web pages that have a web address that includes the domain name of the web pace, wherein the second plurality of web pages includes only the identified other web pages, and wherein the at least two web pages have different domain names;
receiving a second search query, the second search query having been entered through the second input box of the search interface while the first set of search results are displayed;
in response to receiving the second search query, performing the second search over the second plurality of web pages to generate a second set of search results for the second search, the second search based at least in part on the second search query, wherein each search result in the second set of search results includes a link to a respective one of the second plurality of web pages, and wherein at least one search result in the second set of search results includes a link to at least one web page of the second plurality of web pages that is not included in the first plurality of web pages; and
providing, for presentation by the search interface along with the first set of search results, at least two subsets of search results in the second set of search results, wherein search results are presented such that (i) each subset of search results in the second set of search results is presented subordinate to a corresponding search result in the first set of search results, with the corresponding search result in the first set of search results and the search results in the subset of search results each including a respective link to a respective web page having a same domain name, and (ii) the first search query is shown in the first input box of the search interface, and the second search query is shown separately from the first search query in the second input box of the search interface when search results are presented.

7. The computing system of claim 6, wherein determining the second plurality of web pages includes, for each web page of the at least two web pages, identifying web pages that provide a link to the web page, wherein the second plurality of web pages includes the identified web pages that provide the link to the web page.

8. The computing system of claim 6, wherein determining the second plurality of web pages includes, for each web page of the at least two web pages, identifying web pages that are linked to by the web page, wherein the second plurality of web pages includes the identified web pages that are linked to by the web page.

9. Non-transitory computer-readable media storing software including instructions executable by one or more computers which, upon such execution, cause the one or more computers to perform operations comprising:
receiving a first search query, the first search query having been entered through a first input box of a search interface;
in response to receiving the first search query, performing a first search to generate a first set of search results, the first search based at least in part on the first search query, wherein each search result in the first set of search results includes a link to a respective one of a first plurality of web pages, the first plurality of web pages being the respective web pages linked to by the search results in the first set of search results;
providing the first set of search results for presentation by the search interface along with a second input box that is separate from the first input box and displayed with the first input box;
for at least two web pages of the first plurality of web pages linked to by a search result in the first set of search results, determining a second plurality of web pages over which to perform a second search, wherein determining the second plurality of web pages includes, for each web page of the at least two web pages, (i) identifying a domain name of the web page, and (ii) identifying all other web pages that have a web address that includes the domain name of the web page, wherein the second plurality of web pages includes only the identified other web pages, and wherein the at least two web pages have different domain names;
receiving a second search query, the second search query having been entered through second input box of the search interface while the first set of search results are displayed;
in response to receiving the second search query, performing the second search over the second plurality of web pages to generate a second set of search results for the second search, the second search based at least in part on the second search query, wherein each search result in the second set of search results includes a link to a respective one of the second plurality of web pages, and wherein at least one search result in the second set of search results includes a link to at least one web page of the second plurality of web pages that is not included in the first plurality of web pages; and
providing, for presentation by the search interface along with the first set of search results, at least two subsets of search results in the second set of search results, wherein search results are presented such that (i) each subset of search results in the second set of search results is presented subordinate to a corresponding search result in the first set of search results, with the corresponding search result in the first set of search results and the search results in the subset of search results each including a respective link to a respective web page having a same domain name, and (ii) the first search query is shown in the first input box of the search interface, and the second search query is shown separately from the first search query in the second input box of the search interface when search results are presented.

10. The non-transitory computer-readable media of claim 9, wherein determining the second plurality of web pages includes, for each web page of the at least two web pages, identifying web pages that provide a link to the web page, wherein the second plurality of web pages includes the identified web pages that provide the link to the web page.

11. The non-transitory computer-readable media of claim 9, wherein determining the second plurality of web pages includes, for each web page of the at least two web pages, identifying web pages that are linked to by the web page, wherein the second plurality of web pages includes the identified web pages that are linked to by the web page.

* * * * *

UNITED STATES PATENT AND TRADEMARK OFFICE
CERTIFICATE OF CORRECTION

| | |
|---|---|
| PATENT NO. | : 10,572,561 B1 |
| APPLICATION NO. | : 15/656761 |
| DATED | : February 25, 2020 |
| INVENTOR(S) | : Corin Anderson |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this
Thirty-first Day of January, 2023

*Katherine Kelly Vidal*

Katherine Kelly Vidal
*Director of the United States Patent and Trademark Office*